United States Patent [19]

Smith et al.

[11] 4,190,633

[45] Feb. 26, 1980

[54] CRUD HANDLING CIRCUIT

[75] Inventors: Jay C. Smith, Gonzales; Ronald J. Manuel, Prairieville; James E. McAllister, Baton Rouge, all of La.

[73] Assignee: Freeport Minerals Company, New York, N.Y.

[21] Appl. No.: 785,947

[22] Filed: Apr. 8, 1977

[51] Int. Cl.$^2$ ............................................. C01B 25/16
[52] U.S. Cl. .................................... 423/321 S; 423/8; 423/10
[58] Field of Search .................. 423/321 S, 8, 9, 10; 210/5

[56] References Cited

U.S. PATENT DOCUMENTS

| | | | |
|---|---|---|---|
| 3,320,033 | 5/1967 | Goren ........................................ | 423/8 |
| 3,619,161 | 11/1971 | Knarr et al. ........................ | 423/321 S |
| 3,867,511 | 2/1975 | Chiang et al. .................... | 423/321 S |
| 3,969,483 | 7/1976 | Stinson et al. ..................... | 423/321 S |

OTHER PUBLICATIONS

"Recovery of Uranium from Wet Process Phos. Acid'-Ind. Eng. Proc. Des. Dev.-vol. 11-#1-1972.
"Recovery of Uranium from Wet Process Phos. Acid by Extr. w/Octylphenylphos. Acid"-Ind. Eng. Proc. Des. Dev.-vol. 13-#3-1974.

Primary Examiner—O. R. Vertiz
Assistant Examiner—Thomas W. Roy
Attorney, Agent, or Firm—Fisher, Christen, and Sabol

[57] ABSTRACT

A method for handling the problem of crud formation in the solvent extraction of wet-process phosphoric acid is described. Crud is the name ordinarily given to the thick interfacial layer of semi-floatable material which tends to form and accumulate, and which interferes with many of the extraction processes and, in particular, with the solvent extraction of wet-process phosphoric acid. The method described provides for the operation of the solvent extraction stages in a manner that allows the formation and temporary accumulation of crud in those stages whereupon the solvent and the crud are then removed from the extraction stages and treated in a series of operations which include a clarification step, an acid removal step, a water wash step and a caustic treatment step, which steps effectively separate the solvent from the crud, and remove the crud components from the system and regenerate otherwise unusable solvent.

The invention is particularly applicable to the solvent extraction of wet-process phosphoric acid for the recovery of uranium by the reductive stripping technique.

7 Claims, 1 Drawing Figure

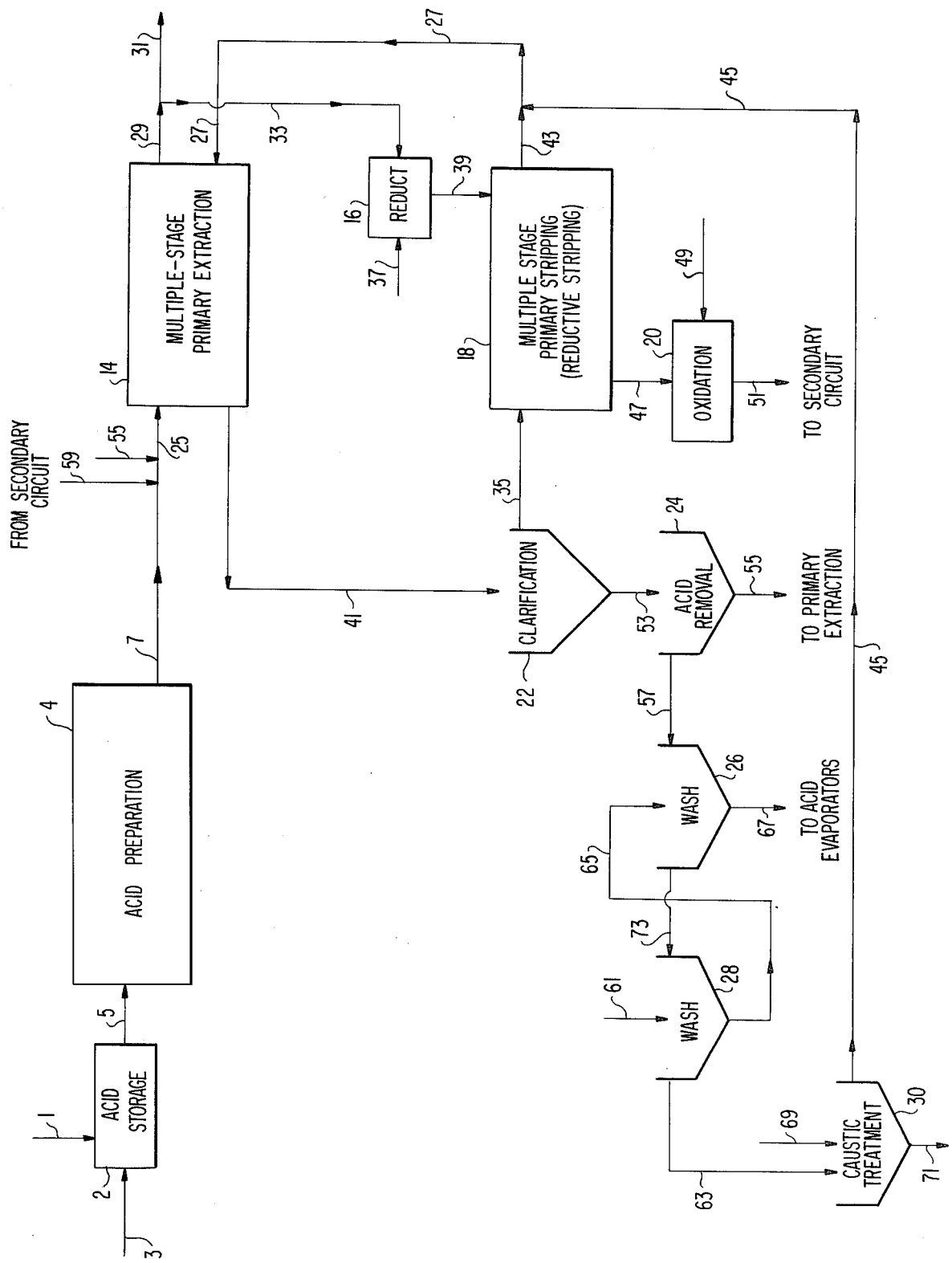

CRUD HANDLING CIRCUIT

FIELD OF THE INVENTION

This invention relates to the solvent extraction of wet-process phosphoric acid, and, in particular, to the solvent extraction of wet-process phosphoric acid wherein a substantial portion of the solvent extractant used is made up of organic compounds that tend to form crud. The invention is specifically concerned with the solvent extraction of wet-process phosphoric acid for the recovery of uranium values by the so-called "reductive stripping technique".

DESCRIPTION OF THE PRIOR ART

The term "crud" is commonly used to refer to a thick interfacial layer of semi-floatable suspended material which tends to form, and does form, during certain solvent extraction operations. When crud appears in the course of these operations, its formation is usually associated with the coming together of fine particulate solids and the solvent organic used to extract the desired component or components. The fine particulate solids usually enter the process with one or both of the phases being contacted. In addition, crud-forming materials are also believed to enter solvent extraction operations with process streams that often have to be used at some point or another in order to provide, for example, beneficiating agents, defoamers and phase stabilizers.

In the case of the solvent extraction of wet-process phosphoric acid, crud-forming materials are thought to include a number of organic and inorganic solid compounds such as sulfates, fatty acids, humic substances, tallow amines, siliceous materials, iron compounds, aluminum compounds and others. Although, in most cases, the actual composition and the exact mechanism by which crud forms are not accurately known or completely understood, it is an established fact, nevertheless, that when the crud forms, its presence sometimes interferes with the separation of the phases in the mixer-settler units that are normally employed in these processes, and often clog or otherwise interfere with the operation of the extraction equipment. Often, when the organic extractant used is an expensive one—and usually they are very expensive—organic losses due to the affinity of the organic for the solids associated with the crud might be of such magnitude as to make the whole process economically unfeasible.

A typical example of a solvent extraction process that suffers from the infirmities of crud formation problems is the solvent extraction of wet-process phosphoric acid and, in particular, the solvent extractants known to selectively extract uranium and rare earths from the acid. Examples of such selective extractants are the mono- and disubstituted phenyl esters of orthophosphoric acid dissolved in inert diluents and the synergistic mixtures of dialkylphosphoric acids and trialkylphosphine oxides dissolved in inert diluents. Extraction processes that make use of these selective extractants are described, for example, in U.S. Pat. Nos. 3,737,591 and 3,835,214.

One way of minimizing the problems caused by crud formation in the solvent extraction of wet-process phosphoric acid is, of course, to prevent or minimize the formation of the crud. One such method for preventing or minimizing formation of crud has been disclosed in commonly-assigned U.S. Application Ser. No. 656,981, entitled, "Method of Treating Phosphoric Acid to Prevent Crud Formation During Solvent Extraction". While this method produces satisfactory results it requires the installation of a chemical treatment circuit prior to the extraction stages, and it introduces new streams into the process which, naturally, have to be properly handled and carefully controlled so as to avoid possible contamination and deterioration of the main process streams.

Another way of minimizing crud formation problems is by treating the phosphoric acid, prior to extraction, with $H_2O_2$. This technique is designed to minimize the formation of crud which forms due to the presence of humic substances in the acid. The technique has been successful in some cases, but has failed in others, apparently because the humic substances are not the only substances in phosphoric acid that are responsible for the formation of crud.

SUMMARY OF THE INVENTION

The present invention provides a method for handling the problem of crud formation during the solvent extraction of wet-process phosphoric acid which comprises the steps of:

1. Operating the solvent extraction stages to allow the formation of a crud mass in said stages;
2. Removing at least a portion of the formed crud mass, together with solvent, from said stages;
3. Separating the removed solvent and crud mass from each other by means of clarification, and;
4. Subjecting the crud mass separated in Step 3 to an acid removal step, a water wash and a caustic treatment, whereby solvent that remains associated with the crud mass after the clarification operation is recovered and recycled for re-extraction, and whereby the components of the crud are separated and purged from the system.

It is an object of this invention, then, to provide a solution to those problems associated with crud formation during the solvent extraction of wet-process phosphoric acid.

In particular, it is an object of this invention to provide a method for handling the problems of crud formation during the solvent extraction of uranium and rare earths from wet-process phosphoric acid.

An even more particular object of this invention is to provide a method for handling the crud formation problems of a solvent extraction process for the recovery of uranium values from wet-process phosphoric acid by the reductive stripping technique, which method solves said problems without the need of a chemical treatment prior to the extraction stages.

These and other related objects of this invention will be apparent to those skilled in the art from the description that follows.

BRIEF DESCRIPTION OF THE DRAWING

The FIGURE shows a schematic diagram of a crud handling circuit according to the present invention in conjunction with the solvent extraction of wet-process phosphoric acid for the recovery of uranium.

DETAILED DESCRIPTION OF THE PREFERRED EMBODIMENT

The preferred embodiment of the invention is illustrated in the FIGURE, and it involves the application of the present method to the solvent extraction of wet-process phosphoric acid for the recovery of uranium values by means of synergistic mixtures of dialkylphosphoric acids and trialkylphosphine oxides dissolved in inert diluents. More specifically, the preferred embodiment involves the solvent extraction recovery of uranium from phosphoric acid by the so-called "reductive stripping technique", a typical version of which is described hereinbelow.

Referring to the FIGURE, dilute (about 30% $P_2O_5$ by weight) phosphoric acid 1, manufactured by a wet process, is fed to acid storage tank 2 where it joins optional recycle acid 3 from other stages of the process. Leaving acid storage tank 2, acid process feed stream 5 goes to the acid preparation stages 4, where it is prepared for the solvent extraction stages that follow. The acid preparation stages include one or more oxidation steps and one or more solids removal steps. The oxidized acid stream 7 leaving the acid preparation stages 4 has had its uranium content oxidized from the $U^{+4}$ state in order to prepare it for the extraction operation that follows, as explained in much more detail in ORNL-TM-2522, "Solvent Extraction of Uranium from Wet-Process Phosphoric Acid", by F. J. Hurst et al., a publication of the U.S. Atomic Energy Commission (ERDA), the disclosure of which is hereby incorporated by reference. From the acid preparation stages 4, the oxidized aqueous stream 7 contacts recycle streams 55, from the acid removal step 24, and 59, from the secondary circuit of the process (not shown), to make up stream 25, which is a 30% $P_2O_5$ acid, containing about 100–300, and preferably about 150, ppm uranium expressed as $U_3O_8$. Stream 25 is fed to the multiple-stage primary extraction operations 14 where it contacts a synergistic organic mixture 27 of di(2-ethylhexyl) phosphoric acid (D2EHPA), and trioctylphosphine oxide (TOPO), dissolved in a kerosene-like diluent flowing countercurrently with the oxidized acid stream. In the primary extraction stages, the D2EHPA-TOPO mixture extracts the uranium from the phosphoric acid, leaving the $P_2O_5$-containing aqueous phase (extracted acid) behind. All of extracted acid 29 may be sent to further processing in other stages of the wet process; e.g., to the acid evaporators, in order to be concentrated, purified and shipped to customers, or the extracted acid may be divided into a major portion 31 which goes to further processing, as just stated, and a minor portion 33 which is used to make the stripant for the reductive stripping step. Thus, in a preferred embodiment, stream 33 is used to strip the uranium-loaded organic 35 by first passing it through a reduction step 16 where divalent iron 37 is injected into it to make reductive stripping solution 39. As explained below, stream 41, leaving the multiple-stage primary extraction operation 14, often comprises not only the uranium-loaded organic, but also the crud formed in the various stages of the operation. This stream is fed to the clarification step 22, where a crud-lean, uranium-loaded organic 35 is separated from the crud mass. The crud-lean organic 35 is stripped of its uranium values by the reductive stripping technique in multiple-stage primary stripping operation 18, and the stripped organic 43, leaving the primary stripping operation, is blended with regenerated organic 45, the source of which is described below, to make organic stream 27, which is then recycled to extract incoming, uranium-containing acid 25 in the primary extraction stages. The combination of the multiple-stage primary extraction and the multiple-stage reductive stripping operations, where the acid is first extracted and stripped, is conveniently referred to as the primary circuit of the process. The secondary circuit of the process (not shown) involves the re-extraction of the uranium-rich phosphoric acid, made in the primary circuit, and the stripping of the new loaded organic with a suitable stripant, usually an ammonium carbonate solution. Thus, aqueous stream 47, from the primary stripping operation 18, comprising a uranium-loaded phosphoric acid having a $P_2O_5$ content of around 30% by weight, and a uranium content of around 7,000 ppm $U_3O_8$, is oxidized with oxidant 49 in secondary oxidation step 20. The oxidized, uranium-rich acid 51 is subsequently re-extracted, and the extractant re-stripped in order to recover the uranium. A detailed description of the reductive stripping technique, including a disclosure of how to operate both the primary circuit and the secondary circuit, appears in commonly-assigned U.S. Pat. No. 3,737,513, entitled, "Recovery of Uranium from an Organic Extractant by Back Extraction with $H_3PO_4$ or HF", which covers the reductive stripping technique.

The underflow 53 from clarification step 22 is processed, in accordance with the method of this invention, in three successive operations: an acid removal step, a water wash and a caustic treatment.

The acid removal step 24 is carried out by subjecting underflow 53 to settling. Any suitable settling equipment may be used for this operation. Conventional settlers are adequate, and one or more of these units may be used, although only one is necessary. It has also been found that the underflow 55 obtained from the settling operation is a dilute phosphoric acid rich in uranium values which can be conveniently returned to the primary extraction stages to be re-extracted. The settling operation separates and removes valuable acid that carries over (in the form of free aqueous $P_2O_5$) with the organic solvent and crud from the primary extraction stages. The acid removal step recovers most of the $P_2O_5$ present in stream 53.

The overflow 57 from the acid removal step is a stream made up of organic, crud and acid, and containing about 10–60% by volume solvent, 10–70% by volume acid and 10–30% by volume crud solids. This stream is now washed with water 61 in two consecutive stages 26 and 28 to remove and recover $P_2O_5$ that has remained entrained with the crud after the acid removal step. Typically, the $P_2O_5$ content of stream 57 is around 10–20% by weight, while that of washed crud 63 is less than 1% by weight. The removed $P_2O_5$, in the form of dilute acid stream 67, is sent from the water wash operation to other stages of the wet process; e.g., to the acid evaporators, (not shown) for further processing.

From the water wash, washed crud 63 goes to caustic treatment 30, where it contacts an aqueous solution 69 of NaOH and $Na_2CO_3$. The amount and strength of caustic used in the caustic treatment depends on the type of crud treated and the $P_2O_5$ content of the crud. If the crud has less than 1% by weight $P_2O_5$, effective treatment is usually obtained using a 0.5% NaOH—1% $Na_2CO_3$—by-weight aqueous solution with an aqueous-to-organic volumetric flow ratio (A/O) of about 2.5/1. For effective treatment the mixture of crud and caustic should have a final pH of between about 4.5 and 11.0, and preferably between about 6.0 and 9.0. The caustic treatment has the effect of separating the crud solid components from the crud mass and regenerating the organic solvent. The separated crud solid components are purged from the system as waste stream 71, while the regenerated organic solvent is returned to the primary extraction stages as stream 45.

While the method of this invention is particularly suitable to the solvent extraction of uranium from wet-process phosphoric acid by the reductive stripping technique, and while, for convenience, the invention is here described in terms of its application to a reductive stripping process, it will be understood that the method is also applicable to any of a number of wet-process phosphoric acid solvent extraction processes in which crud is formed at the interface region between the extract and the raffinate and which, consequently, suffer from the infirmities of poor phase disengagement, high losses of organic extractant, clogging of extraction equipment, and any of the other disadvantages associated with the formation of crud in these systems. Examples of other processes in which the method of this invention may be used include those described in U.S. Pat. Nos. 3,700,415; 3,437,454; 3,458,282 and 3,694,153.

The invention will now be described in more detail with reference to its application to a solvent extraction process for the recovery of uranium from wet-process phosphoric acid by the reductive stripping technique. Numerals designate the various operations and streams illustrated in the Figure.

The first step in the method of the invention is the operation of the solvent extraction stages in a manner that allows the formation of a crud mass in these stages. This is accomplished by simply using a solvent extractant, of the type that tends to form crud, to extract the acid and providing a sufficiently long retention time in the settlers used to disengage the organic phase from the aqueous phosphoric acid phase to allow the crud solid components to tie up a significant volume of solvent. In practice, the formation of a crud mass will always occur whenever a conventional multiple-stage solvent extraction operation is employed to solvent extract acid with D2EHPA-TOPO-type extractants because the retention times in the settlers employed are always long enough (about 20–30 minutes) to cause the entrapment of crud solid components by the extractant, although shorter retention times in the settlers, e.g., 5–10 minutes, will also result in the formation of a crud mass. In the multiple-stage primary extraction operation 14 of the FIGURE the uranium-containing phosphoric acid 25 is extracted in several stages in a countercurrent fashion. Normally, between 3 and 6 stages are employed, but more or less stages could be used. Each stage consists of a mixer and a settler, and in each stage the aqueous acid phase becomes more depleted of its uranium content while the solvent organic phase, flowing in the opposite direction, becomes more enriched in uranium. As crud forms at the interface in each settler it begins to accumulate, and provisions are made to remove it from the vessel periodically.

The second step of the method, then, consists of the removal of at least a portion of the accumulated crud mass, together with solvent, from the extraction stages. It is preferable to remove the formed crud periodically, after allowing for some accumulation, and by means of the method and apparatus disclosed in commonly-assigned U.S. patent application entitled, "Method and Apparatus for Handling Solvent Extraction Crud", filed on even date herewith. By that method, and with the aid of that apparatus, accumulated crud in each settler is advanced periodically from one extraction stage to the next one in a direction concurrent with the flow of the solvent organic phase. Portions of the solvent move together with the crud each time a crud-removal cycle is made. The disclosure of this method and apparatus is hereby incorporated by reference. Using the method and apparatus of the commonly-assigned application, the crud mass and the solvent organic are removed and leave multiple-stage primary extraction 14 via stream 41. The composition of stream 41 will vary, depending on the frequency and method of crud removal used in the extraction stages. Right after a crud removal cycle has been made, the crud content of stream 41 might be as high as about 40–50% by volume, with the rest of it being uranium-rich solvent organic (about 40–60% by volume) and carry-over aqueous (less than 10% by volume). In between cycles, on the other hand, stream 41 will be made up mostly of organic solvent with a small fraction of carry-over aqueous. Illustratively, stream 41 has a uranium content of 200 ppm $U_3O_8$ and a $P_2O_5$ content of less than 0.5% by weight.

The third step of the method involves the separation of the removed solvent and crud mass from each other by means of clarification. Accordingly, stream 41 is fed to a large clarifier, or "crud thickener", in the operation indicated by numeral 22 of the FIGURE. In between cycles, the overflow 35 from the large clarifier represents more than 95% of stream 41; in fact, in a preferred embodiment the underflow 53 from the clarification operation is adjusted to less than 1% of the volume of stream 41. In the clarification step the carry-over aqueous and the crud mass are separated from the bulk of the uranium-rich solvent. Thus, depending on whether the process is operating in between cycles or during a cycle, underflow 53 is made up entirely of free acid, entirely of crud or some combination of free acid and crud. A typical composition of this stream is 25% by weight $P_2O_5$, 1% by weight crud solids and 16% by weight solvent, the balance being water. As already stated, overflow 35 is processed by the reductive stripping technique in multiple-stage primary stripping operation 18.

From the clarification step underflow 53 advances to the fourth, and last, step of the method of this invention, where it is subjected to three consecutive operations: an acid removal step, a water wash and a caustic treatment.

In the acid removal step 24 underflow 53 is simply allowed to settle in a suitable settling vessel. When this is done the aqueous carry-over, containing uranium-rich phosphoric acid, separates from the crud-solvent mixture by gravity and is conveniently withdrawn from that operation as underflow 55, which is returned to the primary extraction stages for recovery of both the $P_2O_5$ and the uranium contained in it. Underflow 55 typically has a $P_2O_5$ content of around 30% by weight and a uranium content of about 100 ppm $U_3O_8$. The $P_2O_5$ removed from stream 53 in acid removal step 24 seems to be that $P_2O_5$ which has been carried over with the organic phase in the form of free aqueous $P_2O_5$, that is, the $P_2O_5$ which is there as aqueous phosphoric acid. A good portion of the carried over $P_2O_5$ is not in the form of free aqueous phosphoric acid but rather is entrained with the crud components in a manner that prevents its separation from stream 53 by means of a settling operation. Most of this entrained $P_2O_5$ can be removed from the crud material by means of a water wash operation comprising at least one mixing step and one settling step. The water wash operation effectively frees and separates the $P_2O_5$ from the crud and in so doing allows the recovery of valuable $P_2O_5$ and, at the same time, prevents any substantial neutralization of the caustic used in the caustic treatment which follows. Thus, from acid removal step 24 stream 57 advances to two water wash stages 26 and 28 to be washed with water 61. Two stages are used, with the underflow 65 from the second stage being used as the wash medium for the first stage, as indicated in the FIGURE. The aqueous-to-organic volumetric flow ratio (A/O) used in the washing operation is preferably around 3/1. It should not be higher than about 4/1, nor lower than 1/1. The $P_2O_5$ content of underflow 67 from first stage 26 is usually around 4–7% by weight; that of overflow 73 from stage 26 is around 1%.

From second wash stage 28 washed crud 63, having less than 1% $P_2O_5$ by weight, and preferably, less than 0.8%, flows to caustic treatment 30. In caustic treatment 30 the washed crud is treated with an aqueous 0.5% NaOH—1.0% $Na_2CO_3$ using an A/O of about 2.5/1. Both the A/O and the strength of the caustic solution may be varied depending on the type of crud and its $P_2O_5$ content. The concentration of the NaOH in the aqueous caustic solution should be between 0.2 and 2% by weight, preferably around 0.5%, and that of the $Na_2CO_3$ should be between 0 and 3% by weight, preferably around 1%. If no $Na_2CO_3$ is used in making up the caustic solution the concentration of NaOH should be around 1% by weight, or higher. The A/O should be higher than 1/1. Preferably, an A/O in the range of 2/1—4/1, and more preferably 2.5/1, should be employed. For effective treatment the mixture of crud and caustic in caustic treatment 30 should have a final pH of between about 4.5 and 11.0, and preferably between about 6.0 and 9.0. The caustic treatment may be carried out in one stage consisting of one mixer and one settler, or it may be carried out in two or more stages, each consisting of one mixer and one settler. Only one stage, consisting of one mixer and one settler is needed to effectively regenerate the solvent. The regenerated solvent 45 is sent to the extraction stages of the process, preferably via stream 27, which is a composite of regenerated solvent 45 and stripped solvent 43 from the primary stripping operations. The underflow 71 from the caustic treatment represents the aqueous phase carrying the crud components together with the caustic solution.

The mechanism by which the caustic solution regenerates the solvent is not clearly understood. Not all strong bases will regenerate the solvent in the method of this invention, and caustic solutions having in excess of about 5% by weight NaOH are not effective in regenerating the solvent. Likewise, solutions having a sodium content of less than 0.8%, expressed as $Na_2O$, are not effective for the regeneration step either. If the caustic solution contains less than 0.8% $Na_2O$ by weight the solvent cannot be regenerated. Among other things, a solution with a $Na_2O$ content of less than 0.8% apparently causes the active ingredient of the extractant (solvent) to be dissolved by the caustic and, depending on the A/O and the strength of the solvent organic, large quantities of valuable solvent are then lost with waste stream 71, which carries the crud components out of the system from caustic treatment 30. Also, caustic solutions with NaOH concentrations substantially higher than about 5% by weight, i.e., 10–20%, and caustic solutions with $Na_2CO_3$ concentrations substantially higher than about 5% by weight, i.e., 10–20%, will not regenerate. Highly basic conditions, i.e., pH higher than about 11.0, after mixing of the crud and caustic, do not regenerate; slightly acidic conditions do regenerate, but regeneration does not occur if pH is lower than about 4.5.

The following table provides typical numerical values obtained in a reductive stripping process to which the method of this invention is applied. Stream numbers are those of the streams in the FIGURE.

TABLE I

| Stream No. | Phase | #/min. | Gal./min. | %$P_2O_5$ | ppm $U_3O_8$ | Temp. °F. |
|---|---|---|---|---|---|---|
| 25 | A | 12,758 | 1150 | 29 | 148 | 138 |
| 27 | O | 9,139 | 1295 | nil | 9 | 132 |
| 29 | A | 12,694 | 1143 | 29 | 15 | 134 |
| 31 | A | 12,458 | 1122 | 29 | 15 | 134 |
| 33 | A | 236 | 21 | 29 | 15 | 134 |
| 35 | O | 9,130 | 1294 | nil | 194 | 138 |
| 39 | A | 239 | 21.3 | 28.6 | 15 | 138 |
| 41 | O | 9,202 | 1304 | 0.2 | 193 | 138 |
| 43 | O | 9,129 | 1294 | nil | 9 | 133 |
| 45 | O | 9 | 1.23 | nil | 9 | 105 |
| 47 | A | 241 | 21.3 | 28.2 | 7,000 | 135 |
| 53 | CRUD | 72 | 7 | 25 | 95 | 138 |
| 55 | A | 40 | 3.55 | 29 | 105 | 136 |
| 57 | CRUD | 32 | 3.39 | 19.8 | 105 | 137 |
| 61 | A | 93.4 | 11.2 | 0 | 0 | 87 |
| 63 | CRUD | 27.1 | 3.39 | 0.6 | 23 | 110 |
| 65 | A | 94 | 11.2 | 1.0 | 1 | 109 |
| 67 | A | 99 | 11.1 | 6.3 | 5 | 109 |
| 69 | A | 72 | 8.5 | 0 | 0 | 87 |
| 71 | A | 90 | 11 | 0.18 | 6 | 108 |

A/O in washing = $\frac{11.2}{3.39}$ = 3.3

A/O in caustic treatment = $\frac{8.5}{3.39}$ = 2.5

Caustic strength: 0.5% NaOH; 1% $Na_2CO_3$.

What is claimed is:

1. A process for treating semi-floatable, crud-forming material formed during the extraction of dissolved constituents from aqueous wet process phosphoric acid phase using an organic solvent extractant phase, comprising the steps of:
  (a) operating the solvent extraction stages of the process to allow the formation of the semi-floatable crud material;
  (b) removing at least a portion of the semi-floatable crud material, together with a portion of the solvent, from said stages; and,
  (c) separating the removed solvent from the semi-floatable crud material by the steps of:

(i) clarifying the removed solvent and semi-floatable crud material to remove organic material therefrom;

(ii) subjecting the underflow from the clarification step to a settling process to remove acid therefrom;

(iii) washing the solvent and semi-floatable crud material in amounts sufficient to further remove acid therefrom; and;

(iv) mixing the solvent and semi-floatable crud material with an aqueous caustic solution containing between 0.2–2.0% NaOH (by weight) and between 0–3% $Na_2CO_3$ (by weight) wherein the mixture of crud and caustic has a pH of between 4.5 and 11.0, in an amount sufficient to remove the solvent from the semi-floatable crud material and regenerate said solvent.

2. The method of claim 1 comprising the further step of recycling the removed and regenerated solvent back into the solvent extraction stage of the wet-process phosphoric acid process.

3. The method of claim 1 wherein the washing operation is conducted in two stages.

4. The method of claim 1 wherein the aqueous caustic solution contains 0.5% NaOH and 1.0% $Na_2CO_3$) (by weight).

5. The method of claim 1 wherein the volumetric flow ratio of the aqueous to the solvent/crud in step (iv) is between 2/1 and 4/1.

6. The method of claim 1 wherein the volumetric flow ratio of the aqueous to the solvent/crud in step (iv) approximately 2.5/1.

7. The method of claim 1 comprising the further step of recycling the acid removed in said settling process back into said solvent extraction stages.

* * * * *